United States Patent
DeVos (10) Patent No.: US 7,558,928 B1
(45) Date of Patent: Jul. 7, 2009

(54) LOGICAL APPLICATION DATA RESTORE FROM A DATABASE BACKUP

(75) Inventor: Steven Robert DeVos, Kirkland, WA (US)

(73) Assignee: Symantec Operating Corporation, Cupertino, CA (US)

( * ) Notice: Subject to any disclaimer, the term of this patent is extended or adjusted under 35 U.S.C. 154(b) by 359 days.

(21) Appl. No.: 11/028,443

(22) Filed: Dec. 31, 2004

(51) Int. Cl.
*G06F 12/00* (2006.01)

(52) U.S. Cl. .......................... 711/162; 711/4; 711/161; 707/203; 707/204

(58) Field of Classification Search ................. 711/162; 707/204
See application file for complete search history.

(56) References Cited

U.S. PATENT DOCUMENTS

| | | | |
|---|---|---|---|
| 5,276,860 A * | 1/1994 | Fortier et al. .................. | 714/6 |
| 5,535,381 A * | 7/1996 | Kopper ........................ | 710/52 |
| 5,555,371 A * | 9/1996 | Duyanovich et al. .......... | 714/13 |
| 5,559,991 A * | 9/1996 | Kanfi ......................... | 711/162 |
| 5,835,953 A * | 11/1998 | Ohran ........................ | 711/162 |
| 5,991,542 A | 11/1999 | Han et al. | |
| 6,029,168 A | 2/2000 | Frey | |
| 6,085,298 A | 7/2000 | Ohran | |
| 6,101,585 A | 8/2000 | Brown et al. | |
| 6,360,330 B1 | 3/2002 | Mutalik et al. | |
| 6,542,962 B2 | 4/2003 | Kodama et al. | |
| 6,640,278 B1 | 10/2003 | Nolan et al. | |
| 6,665,815 B1 * | 12/2003 | Goldstein et al. ............. | 714/20 |
| 6,714,952 B2 | 3/2004 | Dunham et al. | |
| 6,829,688 B2 | 12/2004 | Grubbs et al. | |
| 6,847,983 B2 | 1/2005 | Somalwar et al. | |
| 6,865,655 B1 * | 3/2005 | Anderson ................... | 711/162 |
| 6,880,051 B2 | 4/2005 | Timpanaro-Perrotta | |
| 6,910,112 B2 * | 6/2005 | Berkowitz et al. .......... | 711/162 |

(Continued)

FOREIGN PATENT DOCUMENTS

EP   838758 A2 *   4/1998

OTHER PUBLICATIONS

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

(Continued)

*Primary Examiner*—Hyung S Sough
*Assistant Examiner*—Kaushikkumar Patel
(74) *Attorney, Agent, or Firm*—Rory D. Rankin; Meyertons Hood Kivlin Kowert & Goetzel, P.C.

(57) ABSTRACT

A system and method for managing data in a computer system. A backup server is configured to harvest data indicative of logical relationships among data entries in a backup data set. The harvested data and backup data set are stored on a backup medium. Catalog entries are created for both the backup data set and the harvested data. The computer system allows a user to browse the backup catalog, including the logical structure of the content of a particular backup data set. The user may select particular items for restoration from the catalog. In response, the server restores the backup data set and harvested data to a temporary location, identifies data in the harvested data which corresponds to the user's selections, searches the backup data set for the selected items, and initiates restoration of the selected items.

20 Claims, 8 Drawing Sheets

U.S. PATENT DOCUMENTS

| | | | |
|---|---|---|---|
| 6,938,135 B1 * | 8/2005 | Kekre et al. | 711/162 |
| 6,976,039 B2 * | 12/2005 | Chefalas et al. | 707/204 |
| 2003/0163495 A1 | 8/2003 | Lanzatella et al. | |
| 2003/0177149 A1 * | 9/2003 | Coombs | 707/204 |
| 2004/0268068 A1 | 12/2004 | Curran | |
| 2005/0216788 A1 * | 9/2005 | Mani-Meitav et al. | 714/6 |

OTHER PUBLICATIONS

"Repliweb R-1 User Guide—Version 3.1," RepliWeb, Inc., 2002, (27 pages).

"FilesX Xchange RestoreTM For Microsoft Exchange Server," FilesX, Inc., Aug. 2003, (2 pages).

"Instructor Articles," Veritas Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems Inc., Copyright 2000. ftp://ftp.software.ibm.com/software/tivoli/whitepapers/san_datasharing_wp.pdf, (2000), 4 pages.

"Storage management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburg, PA, http://www.pdl.cmu.edu/PDL-FTP/NASD/amiri_thesis.pdf, (Dec. 2000), i-241 pgs.

Wylie, Jay., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

* cited by examiner

LOGICAL APPLICATION DATA RESTORE FROM A DATABASE BACKUP

BACKGROUND OF THE INVENTION

1. Field of the Invention

This invention relates to computer systems and, more particularly, to restoring selected portions of a datastore from a backup datastore.

2. Description of the Related Art

It has become common for organizations to employ large-scale, complex applications to manage a wide variety of information that may be critical to their operations. For example, Microsofti Exchange Server provides an organization with a messaging (e-mail) and collaboration environment. Another example, Microsofti SharePoint Portal Server, provides a unified view (on a website) of information from various applications. Additional examples of large-scale applications, available from various vendors, are well known to those having ordinary skill in the art.

In order for an application, such as those noted above, to provide its desired functionality, it will generally be configured to store a large quantity of data in a datastore. For example, a large-scale application may store data in one or more database repositories, file systems, or other storage media, either local or remote. In order to avoid the loss of data associated with an application, a data protection application is commonly employed to manage backup and restore operations on the datastore.

To backup the data from a datastore, a data protection application may copy the entire contents of the datastore and store the data on backup media. To restore the data to a datastore, a data protection application may execute an operation to restore all of the data to the datastore. However, in some cases it may be desirable to restore only a portion of the data associated with an application to the datastore. For example, in the event that a single mailbox, message, calendar event, or other data item is inadvertently deleted, restoration of only the deleted item may be desired. Unfortunately, given the nature of backup up datasets, selectively restoring particular items may be relatively difficult and inefficient.

Generally speaking, data is backed up to a media that does not support random access. For example, tape is often used as a backup medium. Consequently, in order to gain access to a particular item within the backup dataset, it is generally necessary to first restore the entire backup dataset to a temporary location and then search the restored data for the particular items of interest. However, when selecting a particular backup dataset for restoration, a user generally is not provided with any detailed information concerning the contents of that backup dataset. Rather, a catalog of backups is generally maintained which only provides basic information concerning the backup dataset (e.g., date, size, name, etc.). Therefore, a user must generally make a "best guess" as to which backup dataset contains the item of interest and restore that backup dataset. The user may then search the restored dataset for the item(s) of interest. However, as may be appreciated, the user may not always be correct in guessing which backup dataset includes the item of interest. Consequently, the user may restore and search an entire backup dataset only to find it does not contain the item(s) of interest. Therefore, time and effort may be wasted.

Accordingly, an efficient method and mechanism for restoring data is desired.

SUMMARY OF THE INVENTION

Various embodiments of a computer system and method are disclosed. In one embodiment, a computer system comprises a plurality of data entries and a backup server coupled to a data storage device. The backup server may be configured to harvest a data set indicative of a logical relationship among the plurality of data entries, associate the harvested data set with the corresponding backup data set, and store the harvested data set and the backup data set on the data storage device. Entries are created in a backup catalog that correspond to both the backup data set and the harvested data set. During a restoration procedure, a user may browse the catalog in order to identify a backup data set, or portion of a backup data set, for restoration. Utilizing the catalog entries corresponding to the harvested data set, the user may view the structure and relationships between data items in the corresponding backup data set. The user may select for restoration particular items of data from the backup data set. In response, the backup data set(s) and harvested data set(s) corresponding to the selected items are restored to a temporary location. Data within the restored harvested data which corresponds to the user's selections is then identified. The identified data is then used to locate in the backup data set the selected items for restoration.

In a further embodiment, the logical relationship comprises a hierarchy of groups and each data entry is a member of one or more groups. Each data entry comprises one or more values, each value corresponding to a selection parameter of one or more pre-determined selection parameters. The harvested data set includes a plurality of references, each reference corresponding to one of the plurality of data entries, and each reference comprising data corresponding to the one or more values of a corresponding data entry.

These and other embodiments will become apparent upon reference to the following description and accompanying figures.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
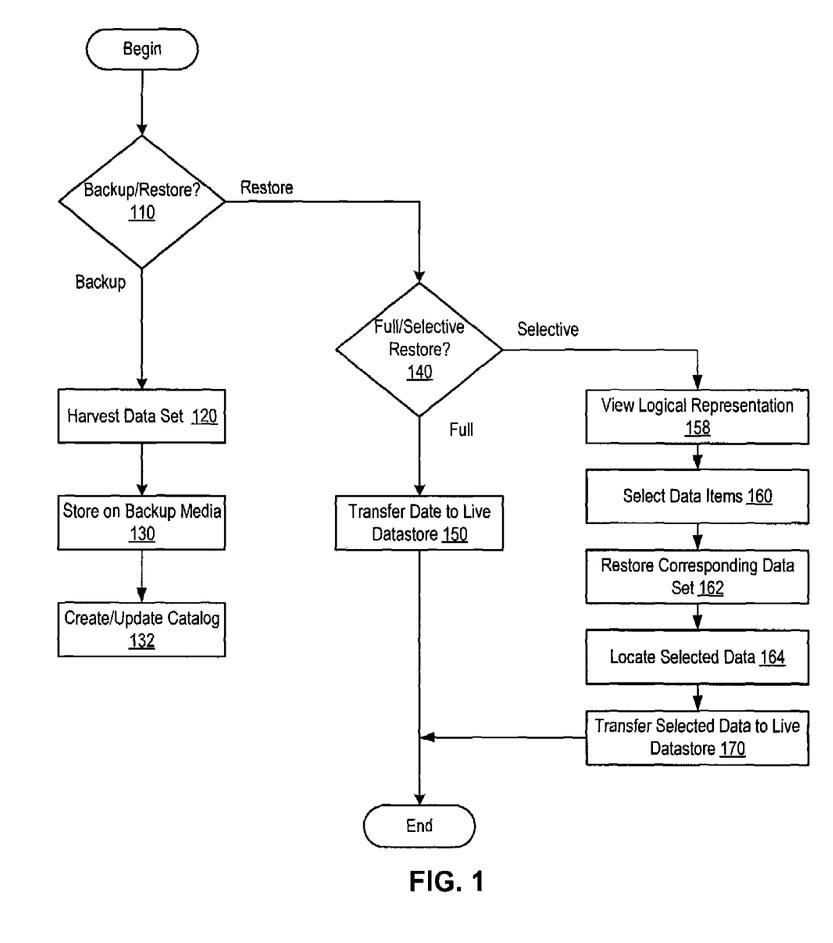
FIG. 1 is a generalized flow chart of the processes of one embodiment of a backup application.

FIG. 1 is a generalized flow chart of processes that may be performed in one embodiment of a backup server. Generally speaking, the backup server may be part of a data protection application, or may be a stand-alone application. The backup server and an application with which backup data is associated may comprise processes installed on and executed by the same host computer. Alternatively, the backup server and an application with which backup data is associated may comprise processes installed on and executed by different host computers. In the embodiment shown, the backup server comprises both backup operations and restore operations, depending on selections made by a user of the backup server, as described below.

In one embodiment, a user may request either to backup data from a live datastore associated with an application whose data is being protected or restore previously backed-up data to the live datastore (decision block 110). As used herein, a datastore refers to any combination of suitable data storage media such as RAM, disk storage, flash memory or other computer-readable storage media that an application may use to store its data. If a backup operation is selected, a data set may be harvested from a backup data set that corresponds to contents of the live datastore (block 120). Generally, the process of harvesting a data set comprises determining the logical relationships that exist between data entries in the backup data set. Once the backup server has harvested a data set from the backup data set, the backup server may store both the harvested and backup data sets on a backup medium (block 130) and a catalog corresponding to the backup data set may be created or updated (block 132) to reflect the new backup. In addition, data corresponding to the harvested data set which provides a logical view, or representation, of the backup data set is also cataloged (block 132). Generally speaking, the harvested data is relatively small compared to the backup data set itself.

Continuing to refer to the embodiment shown in FIG. 1, if a restore operation is selected in decision block 110, the backup server may wait for additional information which indicates whether the user desires to perform a full restoration or a selective restoration (decision block 140). Generally speaking, when initiating a restore operation, the user accesses a catalog(s) that correspond to previously backed-up data sets and selects a particular backup for restore. If a full restoration is desired, the user may simply select a particular backup for restoration and the backup sever may transfer the backup data set from the backup medium to the live data store (block 150). Alternatively, if a selective restore is desired (block 140), the user may browse (block 158) the previously harvested and cataloged data which provides a logical view of the contents of previously performed backups. Upon identifying the desired items, the user may select (block 160) the desired items for restoration. In response, the backup server may then restore the corresponding backup data set (block 162) to a temporary location, automatically initiate a query to locate the items of interest (block 164) within the backup data set, and then cause the items of interest to be restored to the live datastore (block 170). In this manner, the user may not only accurately identify which backup dataset includes the item(s) of interest, but the multi-step process of restoring the backup data set, searching the restored data for the items of interest, and selectively restoring those items to the live datastore may be transparent to the user in the sense that it appears to be a single step process. That is, from the user's perspective, it is only necessary to select the desired items for restoration and the desired items are restored to the live datastore.

Figure 2:
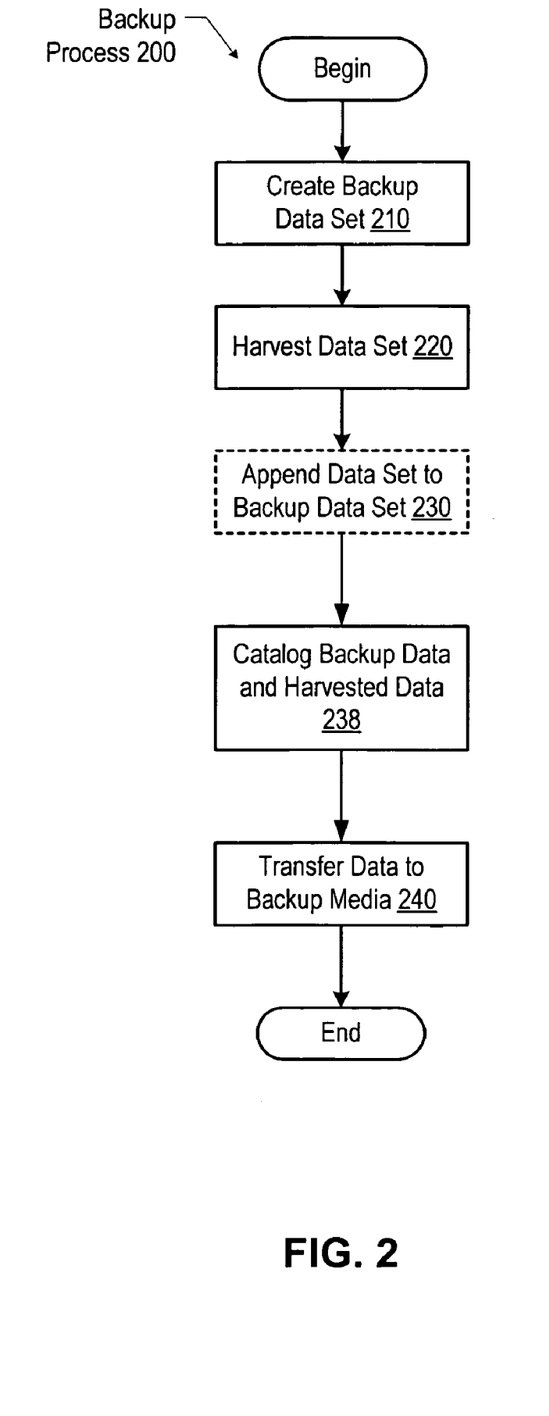
FIG. 2 is a flow chart of one embodiment of a backup process of a backup application.

FIG. 2 is a flow chart of one embodiment of a backup process 200 that may be performed by the backup server. By way of example, backup process 200 may be executed by a backup server upon determining that a user has requested a backup of data from a live datastore as described above in reference to decision block 110. In the embodiment shown the backup server may create a backup data set (block 210) from which to harvest a data set (block 220). The backup data set may be created on a separate host from the live data store or, alternatively, on the same host as the live datastore. In some embodiments, the backup server may harvest the data set from the data entries while they are stored in the live data store. Typically, in that case, the data entries in the live datastore may be locked for the duration of the harvesting process, thereby affecting the availability of the data to the application. The location of the harvesting process may vary from embodiment to embodiment, depending on the configuration, processing power, and data storage capacity of the computer system or systems hosting the application and the backup server.

Generally speaking, the type of data to be harvested may depend on the logical relationships among data entries in the datastore. For example, in one embodiment, data may be stored in a hierarchical database. In such an embodiment, harvesting may include creating data that corresponds to a map or a tree-structure representing the hierarchy. Alternatively, data entries may be represented as rows in a table, each column of which corresponds to a parameter having a value associated with each data entry. In that case, harvesting may include creating a table that contains a pointer to each data entry and a selected subset of the columns containing the values of a selected subset of the parameters for each data entry. In a still further embodiment, each data entry may include one or more group associations. For example, a folder containing files may be considered a group. In such a case, harvesting may include creating a data set that corresponds to the group associations of each data entry. These and other embodiments may be part of the harvesting process.

The harvesting process may depend, as well, on application programming interfaces (APIs) or utilities that may be provided by the application for accessing the data, metadata related to the data, or data describing the logical organization of the data stored in the datastore. For example, harvesting may include execution of a sequence of parametric queries against the backup data set to determine the group associations of each data entry. Alternatively, the application may provide specific APIs through which to request data representing the logical relationships among the data entries in the datastore. In various embodiments, the harvesting process may include these and other methods of obtaining a data set from the backup data set.

Once the backup server has harvested a data set from the backup data set, in the embodiment illustrated in FIG. 2, a backup catalog is updated (or created if necessary) with information corresponding to the new backup (block 238). In addition to providing general information concerning the backup, the catalog is also updated to include information related to the harvested data set. Generally speaking, the catalog is updated with information which enables a user to view (or "browse") the contents of a particular backup in greater detail that would otherwise be possible. The user may not generally be able to browse all of the contents of a particular backup data set. Rather, the catalog may enable the user to view a logical representation of the data in the backup with some degree of detail. For example, a user may be able to view a hierarchy of directories and files within those directories. However, the actual content of the files themselves may not be included in the catalog. Subsequently, the backup server may then transfer the backup and harvested data sets to a backup medium (block 240). In some embodiments, the backup server may append the harvested data set to the backup data set (block 230) and transfer the resulting data set to the backup medium. The backup medium may be any of a number of data storage devices including disk, tape, flash memory, or other suitable devices. Depending on the configuration of the computer system or systems hosting the application and the backup server, the backup medium may be coupled to the computer that hosts the backup server or to a remote system. It is noted that all of the figures described herein are intended to be exemplary only. The steps or processes depicted by these figures may be performed in a different order than that depicted, or in some cases concurrent with other steps.

Figure 3A:
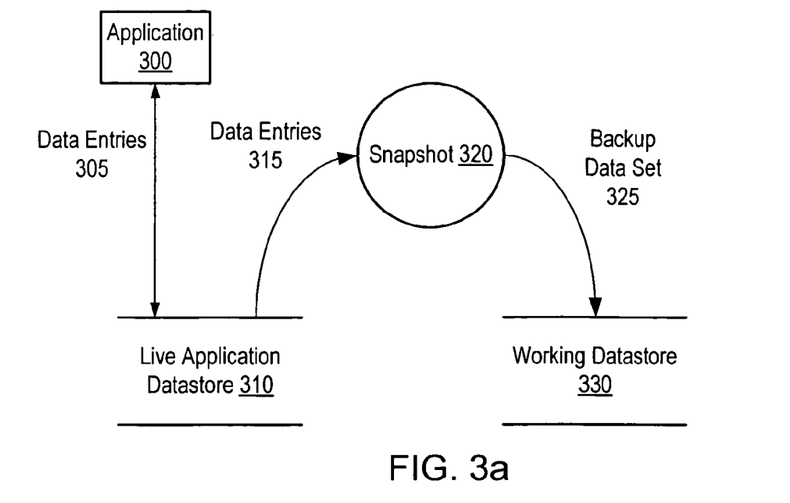
FIG. 3a illustrates one embodiment of data flow during the creation of a backup data set.
Figure 3B:
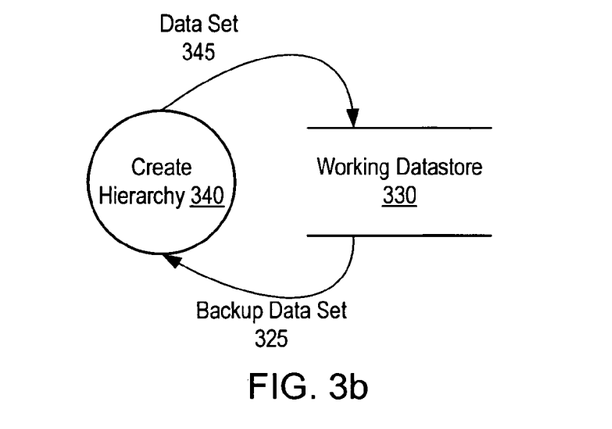
FIG. 3b illustrates one embodiment of data flow during the harvesting of a data set.
Figure 3C:
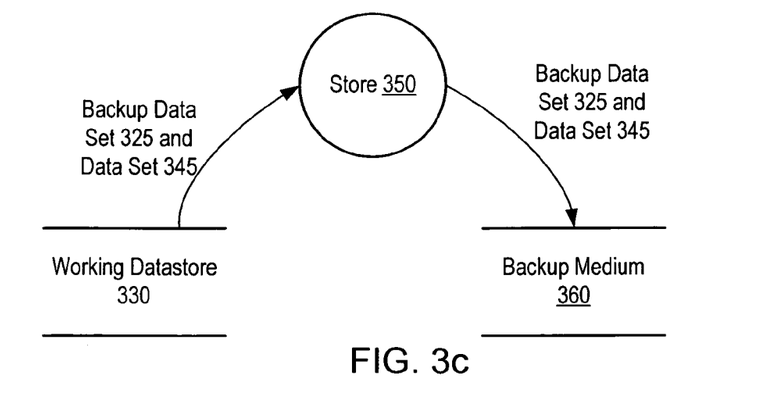
FIG. 3c illustrates one embodiment of data flow during the storage of a data set and a backup data set.

Turning now to FIGS. 3a-3c, the data flow corresponding to one embodiment of a backup operation is illustrated. FIG. 3a illustrates one embodiment of data flow during the creation of a backup data set. FIG. 3b illustrates one embodiment of data flow during the harvesting of a data set. FIG. 3c illustrates one embodiment of data flow during the storage of a data set and a backup data set.

As shown in FIG. 3a, an application 300 may store data entries 305 as part of a live application data store 310. Data entries 305 may include a variety of items depending on the functionality provided by application 300. For example, data entries 305 may correspond to e-mail messages, attachments, mailboxes, etc. Data entries 305 may also be entries in database tables or content items in a content management system. Alternatively, data entries 305 may include configuration data, encryption keys, metadata, and/or other types of data used by application 300. Any of the above types of data, or other types of data that may be stored in a datastore, or combinations of the above may constitute data entries 305.

In one embodiment, a backup server may take a snapshot of data entries 315 from live application datastore 310 (process 320) and store a resulting backup data set 325 in a working datastore 330. In various embodiments, process 320 may include one or more of: locking live application datastore 310, creating a copy 315 of the data entries 305 on the same host as live application datastore 310, or creating a copy 315 of the data entries 305 on a different host. In one embodiment, working datastore 330 contains data corresponding to all of data entries 305 from live application datastore 310. In other embodiments, the working datastore 330 contains data entries corresponding to data entries 305 from live application datastore 310 that have changed since the last backup operation (e.g., as would be found in an incremental backup). To simplify the example, it is assumed that the working datastore contains data corresponding to all of data entries 305 from live application datastore 310.

As shown in FIG. 3b, the backup server may harvest a data set 345 from backup data set 325 stored in the working data store (process 340). Using one or more of the harvesting processes described above, the backup server may harvest data that is indicative of relationships (e.g., logical relationships) among data entries within the backup data set 325. Once a data set has been harvested, the backup server may append or otherwise associate the harvested data set 345 to backup data set 325 in the working datastore as shown. In one embodiment, the harvested data set is not only indicative of logical relationships among the data, but may also include an indication as to the location of particular items within the corresponding backup data set. The backup server, as shown in FIG. 3c, may store both harvested data set 345 and backup data set 325 (process 350) on backup medium 360, thus completing the backup operation. As part of the above backup procedure, a backup catalog is also updated to reflect the newly created backup. In one embodiment, the catalog is updated to reflect both the stored backup data and corresponding harvested data. In this manner, the catalog not only identifies a particular backup data set, but also provides a representative view of the contents of the particular backup data set.

Figure 4:
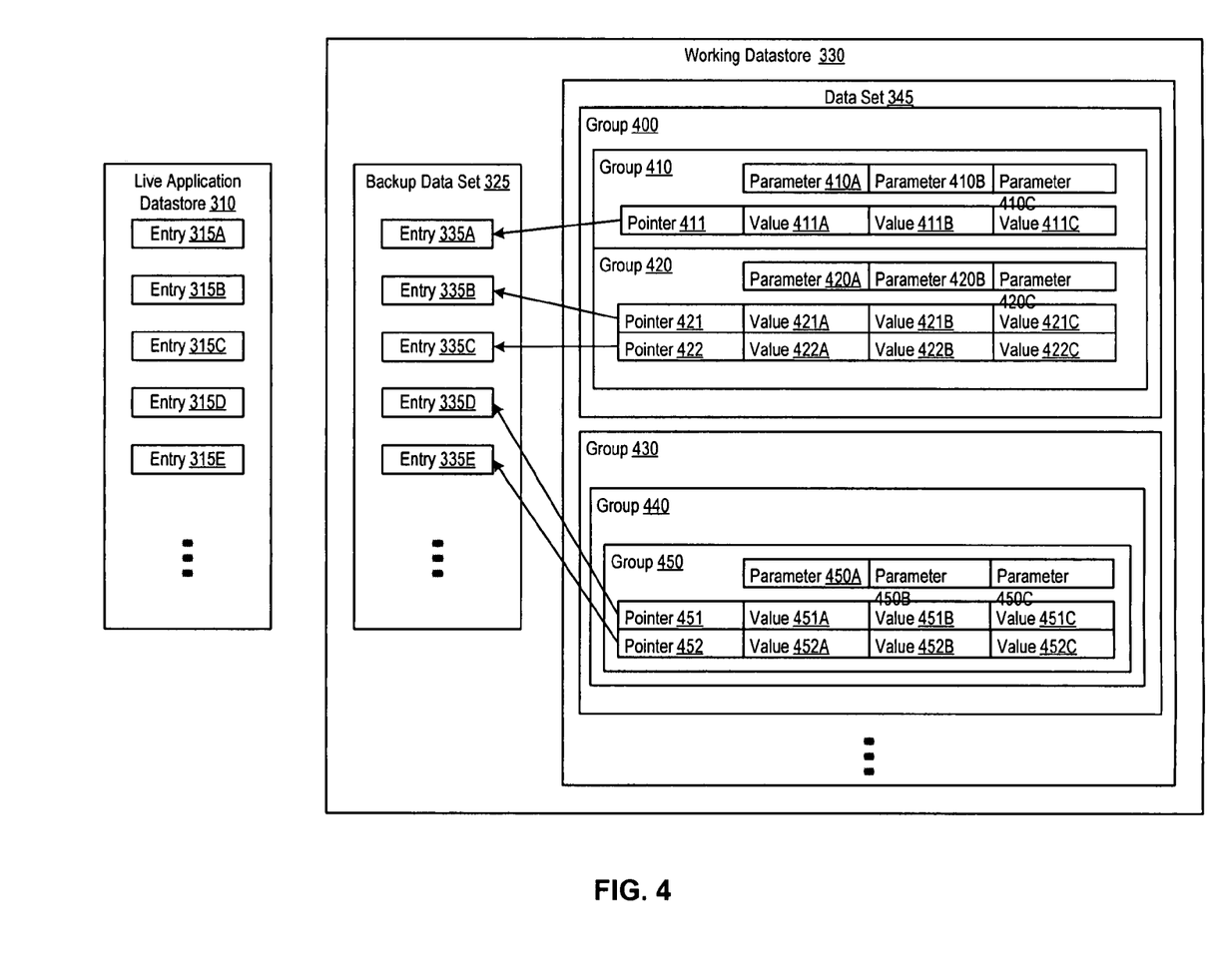
FIG. 4 illustrates one embodiment of logical relationships among the data entries in a datastore.

FIG. 4 illustrates one embodiment of logical relationships among the data entries in a datastore. In the example shown, a backup data set 325 and corresponding harvested data set 345 are shown as a working datastore 330. Generally speaking, both the backup data set 325 and corresponding harvested data set 345 will be stored together during a backup procedure. Accordingly, the working datastore 330 may also be representative of data stored on a backup medium. In addition, as described above, catalog entries will be created to reflect both the backup data set 325 and the corresponding harvested data set 345.

In the example illustrated, working datastore 330 may include data entries 335A-335E, etc. that correspond to data entries 315A-315E, etc. respectively from live application datastore 310. As shown, working datastore 330 may also contain harvested data set 345. Data set 345, in one embodiment, is representative of a set of hierarchical groups 400, 410, 420, 430, 440, and 450. For example, if backup data set 325 corresponds to an e-mail server, the groups depicted in FIG. 4 may correspond to mailboxes and/or folders. While hierarchical groups are used for purposes of discussion, other logical relationships are possible and are contemplated. Group 400 is shown containing groups 410 and 420. Group 430 is shown containing group 440, which contains group 450. Each group may contain one or more references corresponding to one or more of data entries 335A-335E in backup data set 325. Each reference may include an identifier (such as a pointer) that corresponds to a respective data entry 335 and a set of values corresponding to each of a set of parameters for each data entry 335. For example, in one embodiment, group 410 may contain pointer 411 pointing to data entry 335A and values 411A-411C corresponding to parameters 410A-410C respectively. Additionally, pointer 411 and values 411A-411C may correspond to a single reference. Similarly, group 420 may contain pointers 421 and 422 pointing to data entries 335B and 335C and values 421A-421C and 422A-422C corresponding to parameters 420A-420C respectively. Also, group 450 may contain pointers 451 and 452 pointing to data entries 335D and 335E and values 451A-451C and 452A-452C corresponding to parameters 450A-450C respectively.

It is noted that, in the illustrated embodiment, groups may contain other groups. In this and other embodiments, groups may contain both other groups and references. Furthermore, groups may contain any number of references with various numbers of values, depending on the structure and content of backup data set 325. It is further noted that each group may contain the same number of parameters in each reference or a different number of parameters in each reference, or different parameters in each column, depending on the structure and content of backup data set 325. In addition, as noted, groups may be representative of a number of different container objects such as folders, mailboxes, and directories, etc. As may be seen in FIG. 4, the harvested data 345 generally provides a logical view of the data in the backup data set 325 and also identifies a location of each entry within the corresponding backup data set 325. As will be depicted in relation to FIG. 6, the catalog entries corresponding to the harvested data may provide a logical view of the corresponding data, but may not include the locations of the items themselves. So, for example, while the catalog may display a particular folder within a particular mailbox, the catalog may not include information which identifies the actual location of the particular folder in the corresponding backup data set. Rather, selection of the particular folder in the catalog may result in an access to the corresponding harvested data. The harvested data may then provide an indication as to where the particular folder is stored.

Figure 5:
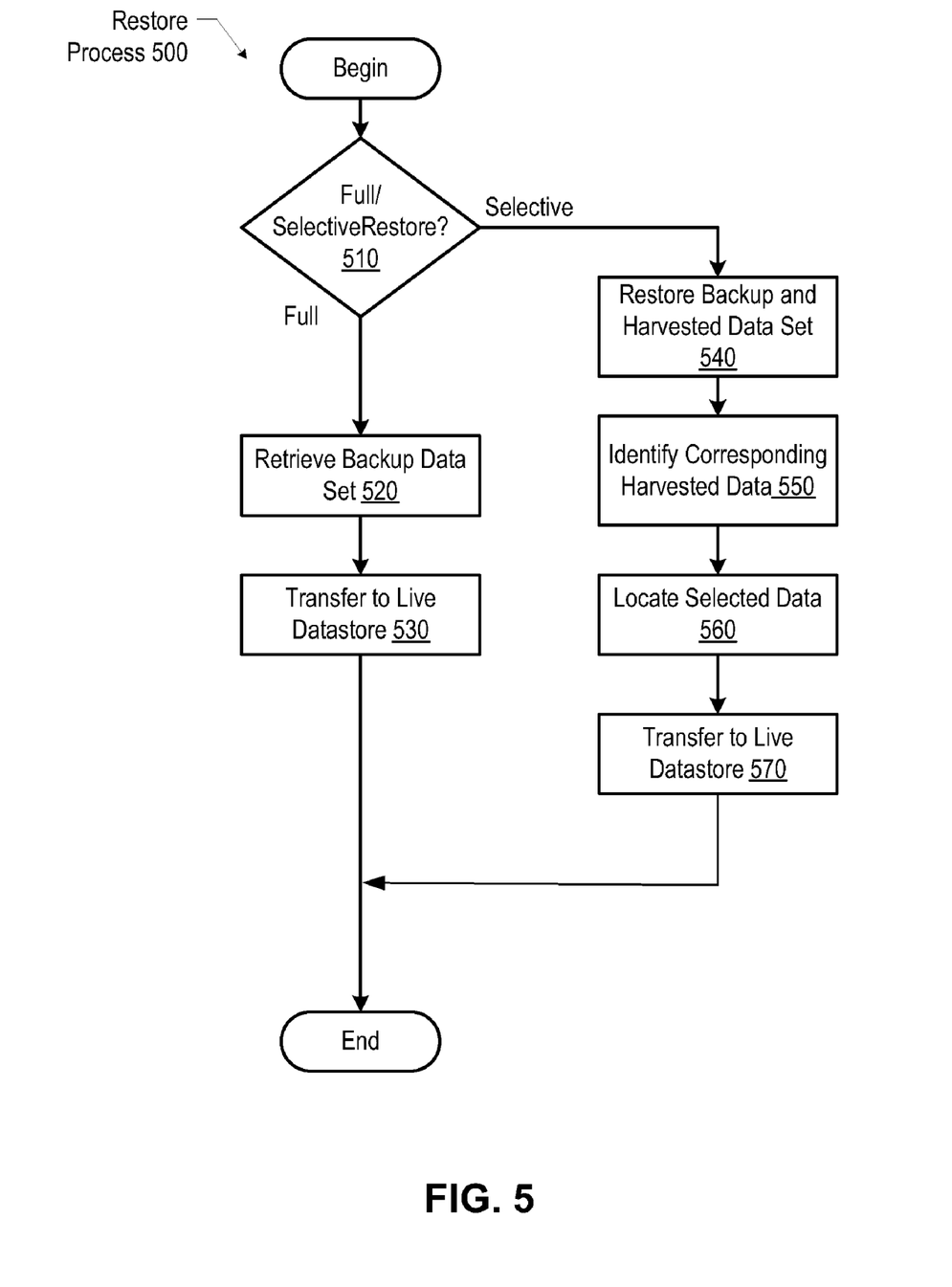
FIG. 5 is a flow chart of one embodiment of a restore process of a backup application.

FIG. 5 is a flow chart of one embodiment of a restore process 500 that may be performed by the backup server. As described above regarding backup process 200, restore process 500 may be executed by a backup server upon determination that a user has requested to restore data from a backup medium as also described above in reference to decision block 110. Generally speaking, a user accesses a backup catalog to identify a particular a backup for restoration. In the illustrated embodiment, the backup server may receive an indication from a user which indicates either a full restoration or a selective restoration is desired (decision block 510). If a full restoration is selected, the backup server may retrieve a selected backup data set from a backup medium (block 520) and restore the backup data set to a live data store (block 530).

If while browsing a backup catalog the user chooses only a selected portion of a backup for restoration, a selective restore is indicated (block 510). In one embodiment, the backup server may provide a catalog interface to a user through which the user may browse the data set and optionally select criteria that may be used to locate or retrieve selected data entries for restoration. In response to detecting a selective restore is desired, the backup data set and corresponding harvested data set are restored from the backup medium to a temporary location (block 540). Based upon the user's selection, data within the restored harvested data which corresponds to the user's selection is identified (block 550). Based upon the identified information, queries are automatically generated which locate and retrieve the corresponding data within the backup data set (block 560). The retrieved data is then transferred for restoration to the live data stored. (block 570).

In some embodiments, an application may include utilities through which selected data may be restored to a live datastore. Accordingly, in one embodiment, the application utilized may itself be used during restoration of the selected data entries to the live data store. In other embodiments, the backup server may be operable to restore selected data entries to the live data store without intervention from the application.

Figure 6:
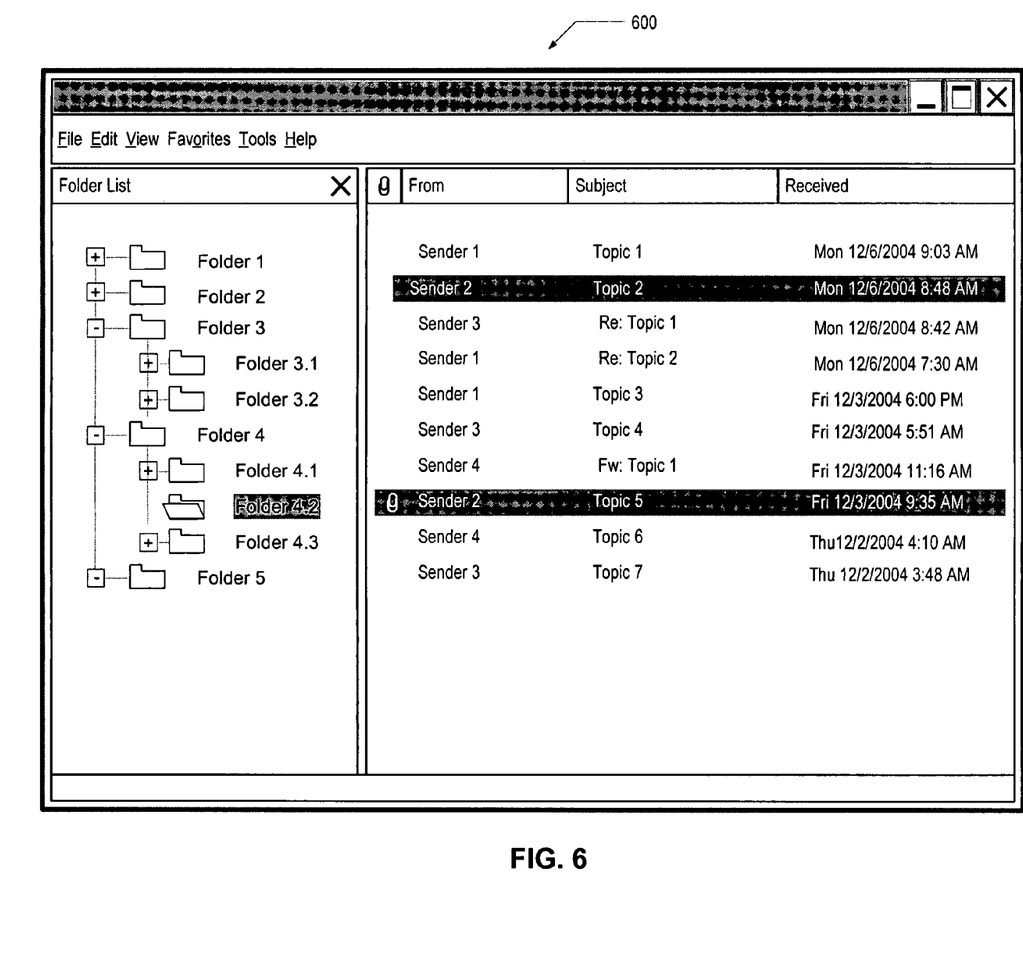
FIG. 6 illustrates one embodiment of a user interface for browsing a data set's logical relationships.

Turning now to FIG. 6, one embodiment of a user interface 600 for browsing a data set's logical relationships is illustrated. Generally speaking, the interface depicted in FIG. 6 may be part of a catalog viewing utility or application. For purposes of discussion in FIG. 6, it is assumed that a particular backup has already been chosen for viewing. In the embodiment shown, user interface 600 presents a view of the data set that may be similar to that of a typical e-mail application's graphical user interface. As shown, interface 600 includes two panes. A right pane may display a table in which each row represents a data entry. Within each row are shown columns of values. Each column may correspond to one selection parameter. A left pane may display logical relationships between these data entries. In the example shown, a hierarchical folder structure is depicted in the left pane.

In the example shown, folders may generally correspond to the groups as previously described in the discussion of FIG. 4. As illustrated, in one embodiment, folders may contain other folders. For example, Folder 4 may contain folders 4.1, 4.2, and 4.3. In the illustrated embodiment, folder 4.2 is highlighted indicating that the user has selected it. Accordingly, the rows displayed in the right pane may correspond to the data entries associated with folder 4.2. In the right pane, four columns are illustrated for purposes of discussion. The first column contains an icon that may represent an e-mail attachment. In one embodiment, any row that displays this icon is associated with a data entry that has an attachment. The second column, labeled "From", corresponds to a parameter whose values correspond to the sender of an e-mail message. The third column, labeled "Subject", corresponds to a parameter whose values correspond to the text in the subject line of an e-mail message. The fourth column, labeled "Received", corresponds to a parameter whose values correspond to the date and time at which an e-mail message was received.

During a selective restore operation, a user may highlight a folder or other group represented on the left pane of user interface 600. Once a folder is highlighted, the contents of the right pane may be browsed. The user may then select specific values of specific parameters (i.e., specific row-column locations). For example, rows in which the "From" parameter has a value of "Sender 2" are highlighted, indicating that the user has chosen to restore all messages in Folder 4.2 that were sent from Sender 2. Upon completing the selection, such as by hitting the "ENTER" key, the backup server may proceed to execute a selective restoration as described above. It is noted that the numerous ways of selecting data and items for restoration. In addition, searches on the data may be performed as well. All such alternatives are contemplated. In addition, other user interfaces, including either graphical or command-line interfaces, may be implemented to provide a method for selecting criteria for a selective restoration. The arrangement of information on the screen, selection procedures, and functionality such as the ability to make multiple selections from one screen may vary from embodiment to embodiment.

Figure 7A:
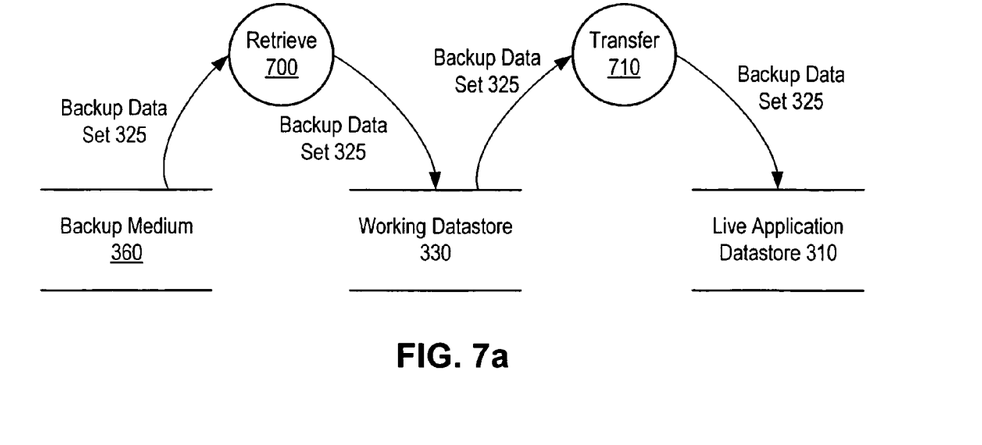
FIG. 7a illustrates one embodiment of data flow during a full restoration operation.
Figure 7B:
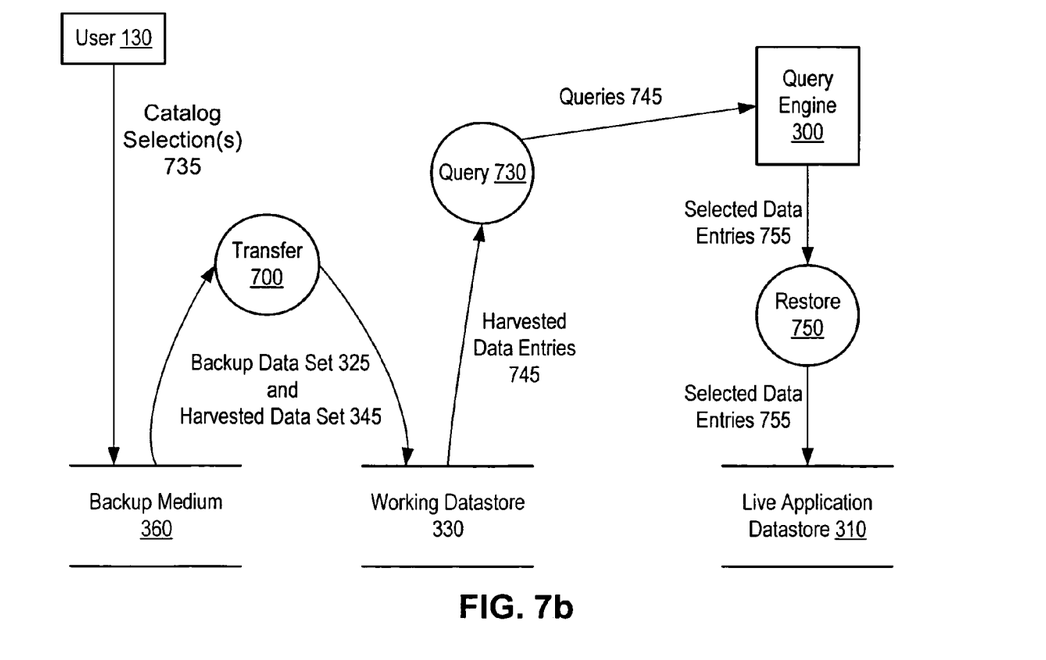
FIG. 7b illustrates the one embodiment of data flow during a selective restoration operation.

FIGS. 7a and 7b illustrate the flow of data during a restore operation. FIG. 7a illustrates one embodiment of data flow during a full restoration operation. FIG. 7b illustrates one embodiment of data flow during a selective restoration operation.

As shown in FIG. 7a, a backup server may retrieve backup data set 325 from backup medium 360 and store it in working datastore 330 (process 700) upon receipt of a request for a full restoration. Once the backup server has stored backup data set 325 in working data store 330, the backup server may restore backup data set 325 to live application datastore 310 (process 710). Alternatively, in some embodiments, the backup server may restore backup data set 325 from backup medium 360 to live application datastore 310 without first storing backup data set 325 on working datastore 330. Typically, the data entries in live application datastore 310 may be locked for the duration of the restoration process, affecting the availability of the data to application 300. The restoration process may be slower if the backup server restores backup data set 325 from backup medium 360 to live application datastore 310 without first storing backup data set 325 on working datastore 330. Accordingly, in one embodiment, the backup server may retrieve backup data set 325, then lock live application datastore 310, and then restore backup data set 325 so as to reduce the duration of the time that live application datastore 310 is locked.

As shown in FIG. 7b, the backup server may retrieve backup data set 325 and data set 345 from backup medium 360 and store them in working datastore 330 (process 720) upon receipt of a request for a selective restoration. As discussed above, an indication that a selective restore is desired is generally responsive to a selection 735 of backup catalog items by a user. Once the backup server has stored the corresponding backup data set 325 and harvested data set 345 in working data store 330, the backup server may then utilize the selections made by the user to identify corresponding data or entries 745 in the restored data set 345. In one embodiment, the retrieved harvested data entries 745 include identifying information which may be used to retrieve the correspond data from the backup data set.

Based upon the retrieved harvested data 745, queries 745 may be generated 730 for a query engine 300. As discussed above, the application to which the data is being restored may itself include utilities for selectively restoring items of data to a live data store. In such an embodiment, the query engine 300 may correspond to APIs of the application itself. In other embodiments, the backup/restore software may include the query engine 300. For example, in one embodiment, query engine 300 may be a Messaging Application Programming Interface (MAPI) compliant e-mail application and query 730 may comprise executing a MAPI request to restore selected data entries to an email message store. Alternatively, in some embodiments, the backup server may restore selected data entries 345 to live application datastore 310 without intervention by application 300, as described above in the example of a full restoration. In response to the queries, corresponding data 755 is retrieved and restored 750 to the live data store 310. It is noted that restoration of a selected item may generally include restoration of other items which are not explicitly selected for restoration. For example, if a user selects a particular folder for restoration, it may be necessary to also restore folders or directories which contain the selected folder. In other cases, logical relationships between data entries may indicate dependencies between the entries. In such a case, restoration of the other data entries in a dependent relationship may be automatically performed as well.

Figure 8:
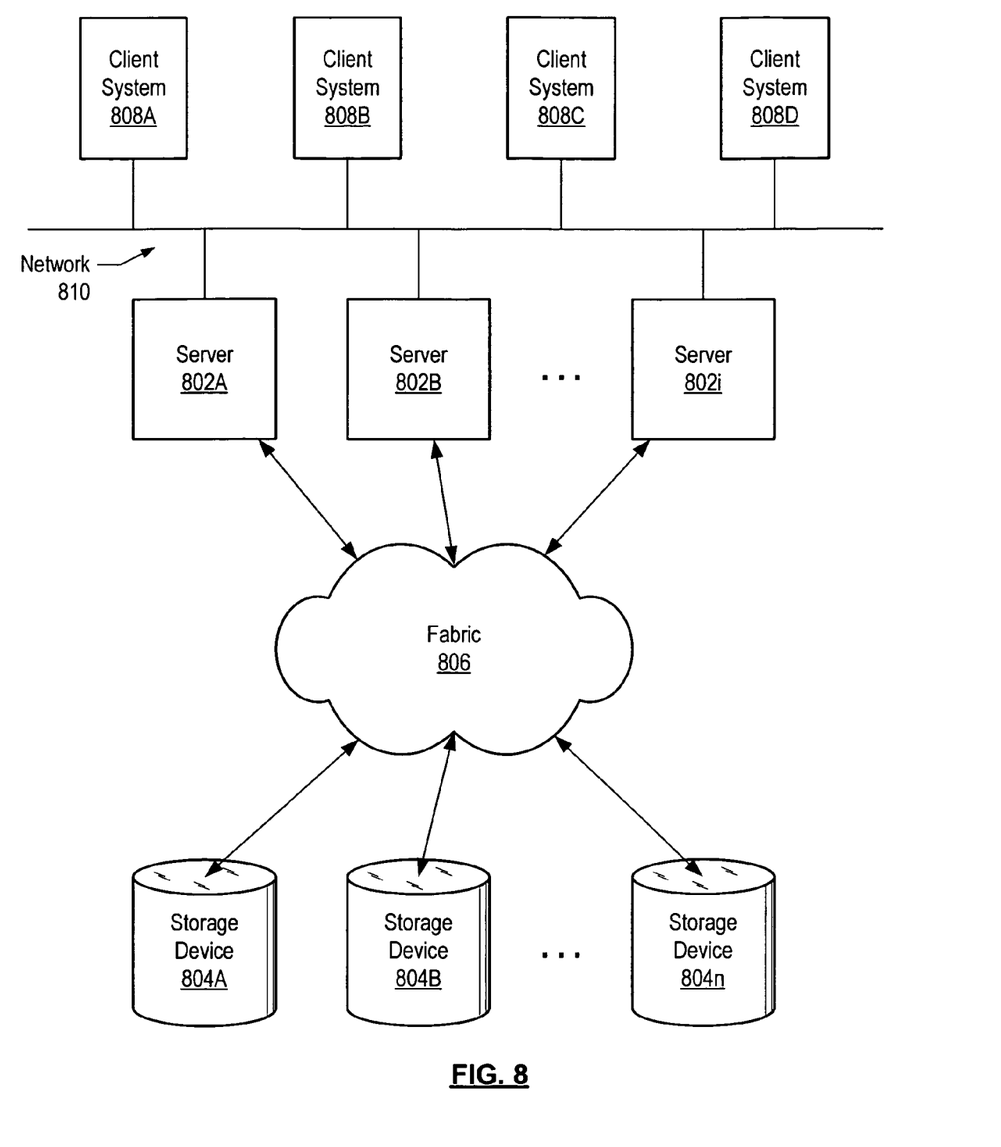
FIG. 8 depicts a computing system.

Turning now to FIG. 8, one embodiment of a computer system in which the above described methods and mechanisms may be utilized is shown. In the illustrated embodiment, a storage area network (SAN) environment is formed by one or more host systems or servers 802 (e.g., servers 802A, 802B and 802i) that are interconnected with one or more associated storage devices 804 (e.g., storage devices 804A, 804B . . . 804x) through an interconnect fabric 806. One or more client systems 808A-808D may access the SAN by accessing one or more of the servers 802 via a network 810. Network 810 may include wired or wireless communication mechanisms such as, for example, Ethernet, LAN (Local Area Network), WAN (Wide Area Network), or modem, among others. Note that throughout this disclosure, drawing features identified by the same reference number followed by a letter (e.g., servers 802A-802i) may be collectively referred to by that reference number alone (e.g., servers 802).

Each of the storage devices 804 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq® Inc., EMC® Corp., and Hitachi® Ltd. Servers 802 may run any of a variety of operating systems such as a Unix® operating system, Solaris® operating system, or a Windows® operating system. Each server 802 may be connected to the fabric 806 via one or more Host Bus Adapters (HBAs).

Fabric 806 includes hardware that connects servers 802 to storage devices 804. The fabric 806 may enable server-to-storage device connectivity through Fibre Channel switching technology. The fabric 806 hardware may include one or more switches (also referred to as fabric switches), bridges, hubs, or other devices such as routers, as well as the interconnecting cables (e.g., for Fibre Channel SANs, fibre optic or copper cables), as desired.

In one embodiment, the SAN may use the Network File System (NFS) protocol to provide access to shared files on the SAN. Using NFS, each server 802 may include a logical hierarchy of files (e.g., a directory tree) physically stored on one or more of storage devices 804 and accessible by the client systems 806 through the server 802. These hierarchies of files, or portions or sub-trees of the hierarchies of files, are referred to herein as "file systems." In one embodiment, the SAN components may be organized into one or more clusters to provide high availability, load balancing, and/or parallel processing. For example, in FIG. 8, a selected set of the servers 802A, 802B . . . 802i may be operated in a cluster configuration. Generally speaking, any of servers 802 or clients 108 may be configured to perform backup and restore operations as described above.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for managing data in a computer system, the method comprising:
   creating a backup data set comprising a plurality of data entries;
   harvesting a harvested data set from the backup data set, wherein said harvesting comprises determining and storing a logical relationship among the plurality of data entries of the backup data set;
   associating the harvested data set with the backup data set;
   storing the harvested data set and the backup data set on a backup medium; and
   creating and storing entries in a backup catalog which correspond to the harvested data set and the backup data set, said entries comprising a user-searchable view of contents of the harvested data set.

2. The method of claim 1, further comprising:
creating a plurality of backup data sets, corresponding harvested data sets, and corresponding entries in the backup catalog;
browsing harvested data set entries in the backup catalog;
selecting one or more items from the harvested data set entries in the backup catalog;
restoring a harvested data set and a corresponding backup data set that correspond to the one or more items selected from the harvested data set entries in the backup catalog to a temporary location;
identifying corresponding data within the harvested data set as restored which corresponds to the selected one or more items; and
utilizing the corresponding data to restore corresponding data from the backup data set as restored to a live data set.

3. The method of claim 2, wherein said identifying comprises performing a search of the harvested data set as restored for references which correspond to the selected one or more items.

4. The method of claim 2, wherein the logical relationship comprises a hierarchy of groups and each data entry of the plurality of data entries is a member of one or more of said groups.

5. The method of claim 4,
wherein each data entry comprises one or more values, each value corresponding to a selection parameter of one or more pre-determined selection parameters;
wherein each harvested data set includes a plurality of references, each of said references corresponding to one of the plurality of data entries; and
wherein each of said references comprises data corresponding to the one or more values of a corresponding data entry.

6. The method of claim 4, wherein harvesting a data set comprises:
associating each of a plurality of references with one or more of the groups; and
for each of the plurality of data entries, storing data which corresponds to one or more values of a given data entry in a corresponding reference.

7. A computer system comprising:
a backup data set comprising a plurality of data entries; and
a backup server coupled to a data storage device;
wherein the backup server is configured to:
harvest a harvested data set from the backup data set, wherein harvesting the harvested data set comprises determining and storing a logical relationship among the plurality of data entries of the backup data set;
associate the harvested data set with the backup data set;
store the harvested data set and the backup data set on the data storage device; and
create and store entries in a backup catalog which correspond to the harvested data set and the backup data set, said entries comprising a user-searchable view of contents of the harvested data set.

8. The computer system of claim 7, wherein the backup server is further configured to:
create a plurality of backup data sets, corresponding harvested data sets, and corresponding entries in the backup catalog;
display an interface which enables a user to:
browse harvested data set entries in the backup catalog; and
select one or more items from the harvested data set entries in the backup catalog;
restore a harvested data set and a corresponding backup data set that correspond to the one or more items selected from the harvested data set entries in the backup catalog to a temporary location;
identify corresponding data within the harvested data set as restored which corresponds to the selected one or more items; and
utilize the corresponding data to restore corresponding data from the backup data set as restored to a live data set.

9. The computer system of claim 8, wherein the one or more items includes one or more:
groups with which one or more references in the harvested data set as restored are associated; and/or
selected values which corresponds to a pre-determined selection parameter.

10. The computer system of claim 9,
wherein the plurality of data entries include one or more of an e-mail message, an e-mail attachment, and an e-mail mailbox; and/or
wherein the selection parameters include one or more of a timestamp, a task name, a folder name, a sender name, a recipient name, a mailbox name, and a sender address.

11. The computer system of claim 8, wherein the logical relationship comprises a hierarchy of groups and each data entry is a member of one or more of said groups.

12. The computer system of claim 10,
wherein each data entry comprises one or more values, each value corresponding to a selection parameter of one or more pre-determined selection parameters;
wherein each harvested data set includes a plurality of references, each of said references corresponding to one of the plurality of data entries; and
wherein each of said references comprises data corresponding to the one or more values of a corresponding data entry.

13. The computer system of claim 11, wherein harvesting a data set comprises:
associating each of a plurality of references with one or more of the groups; and
for each of the plurality of data entries, storing data which corresponds to one or more values of a given data entry in a corresponding reference.

14. A computer storage medium storing computer instructions for managing data in a computer system, wherein the instructions are executable to:
create a backup data set comprising a plurality of data entries;
harvest a harvested data set from the backup data set, wherein harvesting the harvested data set comprises determining and storing a logical relationship among the plurality of data entries of the backup data set;
associate the harvested data set with the backup data set;
store the harvested data set and the backup data set on a backup medium; and
create and store entries in a backup catalog which correspond to the harvested data set and the backup data set, said entries comprising a user-searchable view of contents of the harvested data set.

15. The computer storage medium claim 14, wherein the instructions are further executable to:
create a plurality of backup data sets, corresponding harvested data sets, and corresponding entries in the backup catalog;
display an interface which enables a user to:
browse harvested data set entries in the backup catalog; and select one or more items from the harvested data set entries in the backup catalog;

restore a harvested data set and a corresponding backup data set that correspond to the one or more items selected from the harvested data set entries in the backup catalog to a temporary location;

identify corresponding data within the harvested data set as restored which corresponds to the selected one or more items; and utilize the corresponding data to restore corresponding data from the backup data set as restored to a live data set.

16. The computer storage medium of claim 15, wherein the logical relationship comprises a hierarchy of groups and each data entry is a member of one or more of said groups.

17. The computer storage medium of claim 16, wherein each data entry comprises one or more values, each value corresponding to a selection parameter of one or more pre-determined selection parameters;

wherein each harvested data set includes a plurality of references, each of said references corresponding to one of the plurality of data entries; and wherein each of said references comprises data corresponding to the one or more values of a corresponding data entry.

18. The computer storage medium of claim 16, wherein said harvesting comprises:

associating each of a plurality of references in a particular harvested data set with one or more of the groups; and for each of the plurality of data entries, storing data which corresponds to one or more values of a given data entry in a corresponding reference.

19. The computer storage medium of claim 18, wherein identifying corresponding data within a particular harvested data set comprises performing a search of a particular harvested data set for references which correspond to the selected one or more items.

20. The computer storage medium of claim 19, wherein the plurality of data entries include one or more of an e-mail message, an e-mail attachment, and an e-mail mailbox.

* * * * *